(12) United States Patent
Jen

(10) Patent No.: US 12,554,158 B2
(45) Date of Patent: Feb. 17, 2026

(54) TOUCH DISPLAY PANEL, DISPLAY DEVICE, AND METHOD FOR MANUFACTURING TOUCH DISPLAY PANEL

(71) Applicants: Interface Technology (ChengDu) Co., Ltd., Sichuan (CN); Interface Optoelectronics (ShenZhen) Co., Ltd., Guangdong (CN); General Interface Solution Limited, Miaoli County (TW)

(72) Inventor: Chen-Ming Jen, Guangdong (CN)

(73) Assignees: Interface Technology (ChengDu) Co., Ltd., Sichuan (CN); Interface Optoelectronics (ShenZhen) Co., Ltd., Guangdong (CN); General Interface Solution Limited, Miaoli County (TW)

( * ) Notice: Subject to any disclaimer, the term of this patent is extended or adjusted under 35 U.S.C. 154(b) by 0 days.

(21) Appl. No.: 18/511,990

(22) Filed: Nov. 16, 2023

(65) Prior Publication Data
US 2024/0369871 A1 Nov. 7, 2024

(30) Foreign Application Priority Data
May 4, 2023 (CN) .......................... 202310491352.0

(51) Int. Cl.
*G02F 1/1333* (2006.01)
*G02F 1/1335* (2006.01)
*G06F 3/041* (2006.01)

(52) U.S. Cl.
CPC .... *G02F 1/13338* (2013.01); *G02F 1/133331* (2021.01); *G02F 1/133502* (2013.01);
(Continued)

(58) Field of Classification Search
CPC ........... G02F 1/13338; G02F 1/133331; G02F 1/13312; G02F 1/0139; G02F 1/0311;
(Continued)

(56) References Cited

U.S. PATENT DOCUMENTS

2010/0078562 A1* 4/2010 Dinh .................... G01J 1/0271
250/339.06
2014/0085549 A1 3/2014 Lin et al.
(Continued)

FOREIGN PATENT DOCUMENTS

CN 103033867 A 4/2013
CN 104090677 A 10/2014
(Continued)

*Primary Examiner* — Lauren Nguyen
(74) *Attorney, Agent, or Firm* — CKC & Partners Co., LLC

(57) ABSTRACT

A touch display panel includes an embedded touch liquid crystal display (LCD) module, a polarizer, and a cover plate. The embedded touch LCD module includes a non-filter window. The polarizer is disposed over the embedded touch LCD module and has a non-polarized window, a first vertical projection of the non-polarized window overlaps with a second vertical projection of the non-filter window, and the non-polarized window is filled with an optical clear material. The cover plate overlays the polarizer, and the optical clear material in the non-polarized window contacts the cover plate. The disclosure also provides a method for manufacturing the touch display panel and a display device including the touch display panel.

19 Claims, 20 Drawing Sheets

(52) U.S. Cl.
CPC ........ *G06F 3/0412* (2013.01); *G02F 2201/38* (2013.01); *G06F 2203/04103* (2013.01)

(58) Field of Classification Search
CPC ........ G02F 1/133528; G02F 1/133502; G02F 1/133509; G02F 2201/38; G06F 3/0412; G06F 3/0428; G06F 2203/04103
See application file for complete search history.

(56) References Cited

U.S. PATENT DOCUMENTS

| | | | |
|---|---|---|---|
| 2015/0131035 A1* | 5/2015 | Chen | G02F 1/133533 427/163.1 |
| 2016/0306452 A1* | 10/2016 | Jung | G02F 1/13363 |
| 2017/0184764 A1* | 6/2017 | Matsuyuki | G02B 5/207 |
| 2018/0039145 A1* | 2/2018 | Liao | G02F 1/133528 |
| 2018/0157110 A1 | 6/2018 | Park | |
| 2019/0377224 A1 | 12/2019 | Tanaka | |
| 2020/0026124 A1* | 1/2020 | Kurogane | G02F 1/133528 |
| 2020/0050047 A1 | 2/2020 | Son et al. | |
| 2020/0117034 A1* | 4/2020 | Yin | G06F 1/1605 |
| 2020/0174310 A1 | 6/2020 | Pan et al. | |
| 2020/0186688 A1* | 6/2020 | Chen | H04N 23/54 |
| 2020/0411630 A1* | 12/2020 | Kim | H01L 24/03 |
| 2021/0018793 A1* | 1/2021 | Zhang | G02F 1/133512 |
| 2022/0026762 A1* | 1/2022 | Ma | G02F 1/133528 |

FOREIGN PATENT DOCUMENTS

| | | | | |
|---|---|---|---|---|
| CN | 203982335 U | * | 12/2014 | |
| CN | 104951131 A | | 9/2015 | |
| CN | 105425455 A | | 3/2016 | |
| CN | 107688252 A | | 2/2018 | |
| CN | 107767835 A | | 3/2018 | |
| CN | 107831834 A | * | 3/2018 | |
| CN | 108600421 A | | 9/2018 | |
| CN | 108616618 A | | 10/2018 | |
| CN | 108712523 A | | 10/2018 | |
| CN | 109194787 A | | 1/2019 | |
| CN | 208572161 U | | 3/2019 | |
| CN | 109637378 A | | 4/2019 | |
| CN | 110133788 A | | 8/2019 | |
| CN | 110596928 A | | 12/2019 | |
| CN | 211786489 U | | 10/2020 | |
| CN | 112286385 A | | 1/2021 | |
| CN | 113192976 A | | 7/2021 | |
| CN | 113497201 A | | 10/2021 | |
| CN | 113759453 A | | 12/2021 | |
| CN | 114627764 A | | 6/2022 | |
| CN | 114649493 A | | 6/2022 | |
| CN | 116430617 A | * | 7/2023 | ....... G02F 1/133308 |
| DE | 69938817 | | 7/2008 | |
| KR | 20030081729 A | | 10/2003 | |
| KR | 20130003430 A | | 1/2013 | |
| KR | 20140131128 A | | 11/2014 | |
| KR | 20210086002 A | | 7/2021 | |
| KR | 20210118313 A | | 9/2021 | |
| TW | 202248022 A | | 12/2022 | |
| TW | 202303237 A | | 1/2023 | |
| TW | 202311786 A | | 3/2023 | |
| WO | WO-2020-018312 | * | 1/2020 | ........... B32B 27/281 |

\* cited by examiner

TOUCH DISPLAY PANEL, DISPLAY DEVICE, AND METHOD FOR MANUFACTURING TOUCH DISPLAY PANEL

CROSS-REFERENCE TO RELATED APPLICATION

This application claims priority to China Application Serial Number 202310491352.0, filed May 4, 2023, which is herein incorporated by reference in its entirety.

BACKGROUND

Field of Invention

The present disclosure relates to an embedded touch display panel, a manufacturing method thereof, and a display device including the embedded touch display panel.

Description of Related Art

A liquid crystal display (LCD) panel typically has a laminated structure, which is generally formed by stacking a liquid crystal panel, a polarizer and a protective cover in sequence. At present, touch display panels may be divided into two types: out-cell type and embedded type. The out-cell type of touch display panel includes a layer of touch sensor superimposed on the outside of liquid crystal panel. The embedded type of touch display panels may be further divided into two types: on-cell type and in-cell type. In an on-cell type of touch display panel, a touch module is disposed on a liquid crystal module; in an in-cell type of touch display panel, a touch module is disposed within a liquid crystal module. The in-cell type of touch display panel has the advantage of reducing the total thickness; therefore, panel manufacturers continue to actively invest in the research and development of this type of device.

The liquid crystal display panel has a polarizer to control the polarization direction of light, so that the liquid crystal display panel can obtain the changes of light and dark display by applying an external electric field. In conventional display devices, light sensor modules, such as infrared sensors and ambient light sensors, are usually disposed in the frame region of the display panel. However, with the development of full-screen displays, the frame region is getting narrower and narrower, and there is not enough space to set the sensor modules, so it is necessary to dispose the sensor modules in the non-display area outside the edge of the display area. Therefore, it is necessary to form a gap in the polarizer at a position corresponding to the light sensor module, so that external light enters the light sensor module. In the conventional in-cell type of touch display panel, a top polarizer is disposed on the outermost side, and a gap in the top polarizer is formed at a position corresponding to the light sensor module; however, this arrangement makes the outer surface of the touch display panel (i.e., the user's contact surface) uneven. In addition, the top polarizer is made of plastic material. Thus, for the conventional in-cell type of touch display panel, the user's touch feeling is poor.

SUMMARY

In view of the above problems, the technical scheme of the present disclosure improves the arrangement of the user's contact surface and polarizer of the in-cell type of embedded touch display panel. A non-polarized window is formed in the polarizer, and a cover plate is attached to the outer side of the polarizer, so that the outer surface of the touch display panel is fully flat, which is more convenient in operation and enhances the user's touch feeling.

Some embodiments of the present disclosure provide a touch display panel including an embedded touch liquid crystal display (LCD) module, a polarizer, and a cover plate. The embedded touch LCD module includes a non-filter window. The polarizer is disposed over the embedded touch LCD module and has a non-polarized window. A first vertical projection of the non-polarized window overlaps with a second vertical projection of the non-filtering window, and the non-polarized window is filled with an optical clear material. The cover plate overlays the polarizer, and the optical clear material in the non-polarized window contacts the cover plate.

In some embodiments, the cover plate has a thickness less than about 200 μm (micrometers).

In some embodiments, the cover plate has a thickness ranging from about 25 μm to about 50 μm.

In some embodiments, the cover plate includes ultra-thin glass, polymethylmethacrylate, polyethylene terephthalate, polycarbonate, or the like.

In some embodiments, the material of the cover plate is free of triacetyl cellulose.

In some embodiments, the cover plate includes a substrate layer and an optical layer. The substrate layer includes ultra-thin glass, polymethylmethacrylate, polyethylene terephthalate, polycarbonate, or the like. The optical layer is an anti-reflection layer, an anti-glare layer, an anti-fouling layer, the like, or a combination thereof.

In some embodiments, the material of the cover plate is ultra-thin glass having a hardness greater than 7H of pencil hardness.

In some embodiments, the cover plate includes tempered ultra-thin glass.

In some embodiments, the non-polarized window is formed by a through-hole processing.

In some embodiments, the optical clear material has a refractive index ranging from about 1.4 to about 1.7.

In some embodiments, the optical clear material is an optical clear adhesive (OCA) or an optical clear resin (OCR).

In some embodiments, the touch display panel further includes an infrared ink layer disposed under the embedded touch LCD module, and a third vertical projection of the infrared ink layer overlaps with the first vertical projection of the non-filter window and the second vertical projection of the non-polarized window.

In some embodiments, the touch display panel has a first side, a second side, a third side, and a fourth side, and the embedded touch LCD module further includes a terminal region located near the first side of the touch display panel, and in the second side, the third side, and the fourth side, a plurality of respective edges of the embedded touch LCD module, the polarizer, and the cover plate are flush.

In some embodiments, in the first side, the edge of the embedded touch LCD module exceeds the corresponding edge of the cover plate and the corresponding edge of the polarizer.

In some embodiments, in the first side, the edge of the embedded touch LCD module is flush with the corresponding edge of the cover plate and the corresponding edge of the polarizer.

In some embodiments, the polarizer and the cover plate have a total thickness less than about 300 μm.

Some embodiments of the present disclosure provide a display device including a touch display panel and an optical module. The touch display panel is the touch display panel as described in the above and the following embodiments. The optical module is disposed under the embedded touch LCD module, and a fourth vertical projection of the optical module overlaps with the first vertical projection of the non-filter window and the second vertical projection of the non-polarized window.

Some embodiments of the present disclosure provide a method for manufacturing a touch display panel, and the method includes receiving an initial polarizer; forming a through hole in the initial polarizer; attaching the initial polarizer to a cover plate to form a first stack structure; trimming edges of the first stack structure; applying an optical clear material on the initial polarizer of the first stack structure to form a second stack structure, wherein an optical clear material fills the through hole to form a non-polarized window; and attaching the second stack structure with an embedded touch LCD module to form a third stack structure, wherein the embedded touch LCD module has a non-filter window, and the position of the non-polarized window corresponds to the non-filter window.

In some embodiments, in method for manufacturing the touch display panel, the third stack structure has a first side, a second side, a third side and a fourth side, and the embedded touch LCD module has a terminal region near to the first side of the third stack structure, and the method for manufacturing the touch display panel further includes grinding edges of the second side, the third side and the fourth side of the third stack structure.

In some embodiments, in the method for manufacturing the touch display panel, the through hole is formed in an initial polarizer by punching or laser cutting.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
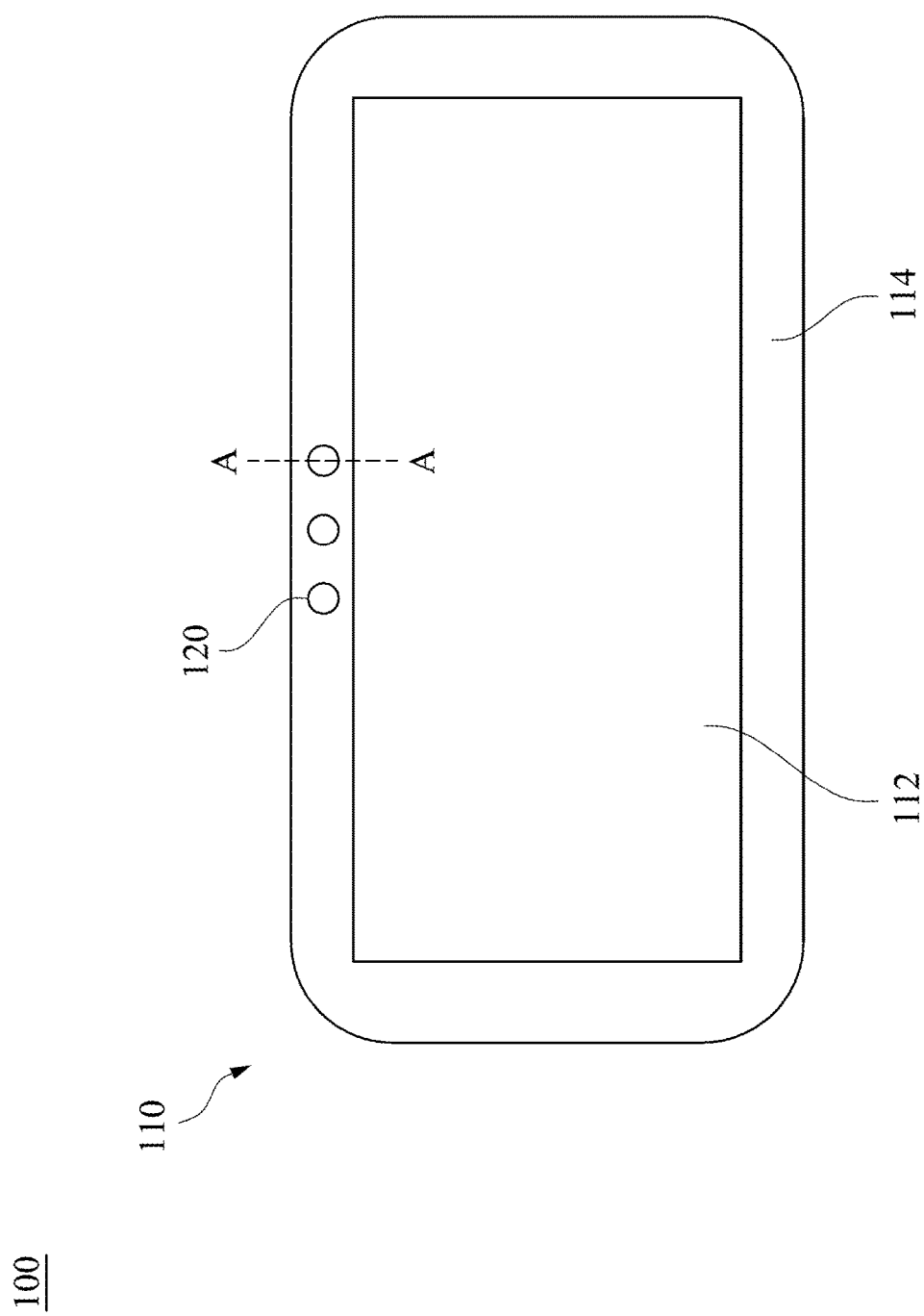
FIG. 1A illustrates a top view of a display device, in accordance with some embodiments.

In order to make the description of this disclosure more detailed and complete, the following is an illustrative description of the embodiments and specific examples of this disclosure; but, this is not the only way to practice or use the specific embodiments of the present disclosure. The embodiments disclosed below can be combined or replaced with each other under beneficial circumstances, and other embodiments can be added to one embodiment without further description or explanation.

In the following description, numerous specific details will be set forth in detail to enable readers to fully understand the following embodiments. However, embodiments of the present disclosure may be practiced without these specific details. In other cases, in order to simplify the drawings, well-known structures and devices are only schematically shown in the drawings.

In addition, the present disclosure may repeat reference numerals and/or letters in the various examples. This repetition is for the purpose of simplicity and clarity and does not in itself dictate a relationship between the various embodiments and/or configurations discussed. In addition, in the following disclosure, the formation of a first feature over or on a second feature in the description that follows may include embodiments in which the first and second features are formed in direct contact, and may also include embodiments in which additional features may be formed between the first and second features, such that the first and second features may not be in direct contact.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1A illustrates a schematic top view of a display device according to some embodiments. The top view of FIG. 1A shows a display device 100 includes a touch display panel 110. The touch display panel 110 includes a display area 112 and a non-display area 114. The non-display area 114 surrounds the display area 112. In the non-display area 114, a plurality of optical modules 120 are provided.

Figure 1B:
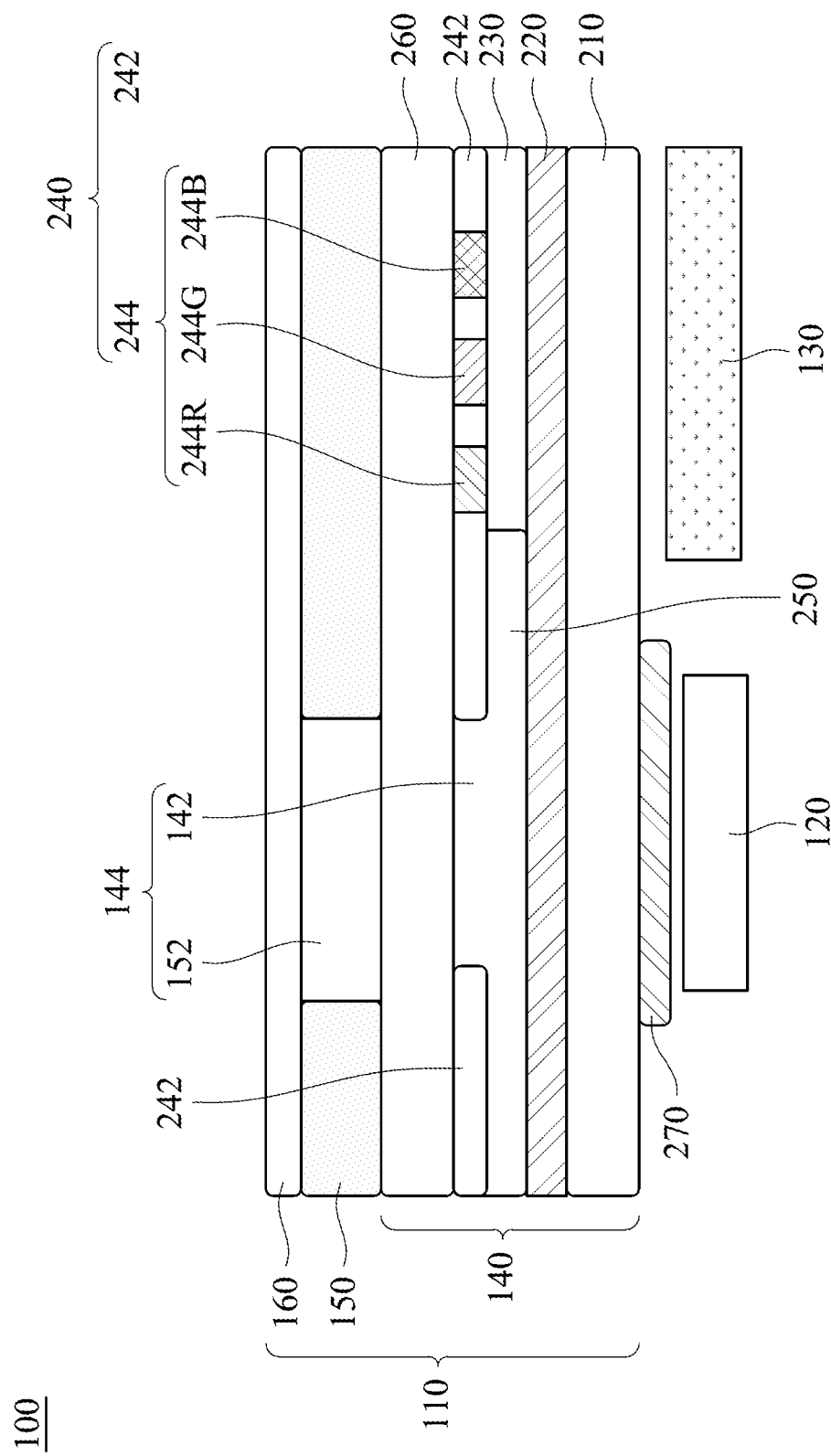
FIG. 1B is a cross-sectional view of the display device of FIG. 1A along cutting line A-A.

FIG. 1B is a partial cross-sectional view of the display device 100 along the cutting line A-A. The display device 100 includes a touch display panel 110, an optical module 120 and a backlight module 130.

Referring to FIGS. 1A and 1B, the touch display panel 110 is an in-cell type of touch display panel. The optical module 120 is located in a position corresponding to the non-display area 114 of the touch display panel 110 and under the touch display panel 110. The backlight module 130 is located in a position corresponding to the display area 112 of the touch display panel 110 and under the touch display panel 110.

In some embodiments, the optical module 120 includes an optical sensor, such as an infrared sensor, an infrared light emitting diode, a visible light lens module, a light emitting diode, a light sensor, an infrared image lens module, the like, or a combination thereof.

As shown in FIG. 1B, the touch display panel 110 includes an embedded touch LCD module 140, a polarizer 150, and a cover plate 160 stacked in sequence. The embedded touch LCD module 140 includes a non-filter window 142. The polarizer 150 includes a non-polarized window 152. The non-polarized window 152 makes the light transmitted to this region unpolarized. As shown in FIG. 1B, a first vertical projection of the non-filter window 142 and a second vertical projection of the non-polarized window 152 overlap to form a light sensing window 144, so that light can enter the optical module 120 from the outside or light can be emitted from the optical module 120. As used herein, "vertical projection" refers to a projection in a direction perpendicular to the touch display panel 110.

As shown in FIG. 1B, the embedded touch LCD module 140 includes a thin film transistor layer 210, a touch layer 220, a liquid crystal layer 230, a color filter layer 240, a sealing layer 250, and a color filter glass 260. In the embedded touch LCD module 140, the touch layer 220 is disposed between the thin film transistor layer 210 and the liquid crystal layer 230, so that the circuit traces for controlling the touch layer 220 and the liquid crystal layer 230 can be disposed above the thin film transistor layer 210, thereby reducing the volume of the embedded touch LCD module 140.

The thin film transistor layer 210 is disposed on a side of the embedded touch LCD module 140 away from the polarizer 150. The touch layer 220 is disposed over the thin film transistor layer 210. The touch layer 220 may include a plurality of touch electrodes. The liquid crystal layer 230 is disposed over the touch layer 220 and located in the display area 112 of the touch display panel 110. The liquid crystal layer 230 includes a plurality of liquid crystal molecules. The sealing layer 250 is disposed in the same layer as the liquid crystal layer 230 and is located in the non-display area 114 of the touch display panel 110. The sealing layer 250 is a transparent material for sealing the liquid crystal layer 230.

The color filter layer 240 is disposed over the liquid crystal layer 230. The color filter layer 240 includes a plurality of light-transmitting filter units 244 and an opaque black matrix 242 separating the plurality of filter units 244. Each filter unit 244 also includes at least three sub-filter units 244R, 244G, and 244B for different primary colors. The colors of different sub-filter units 244R, 244G and 244B in the same filter unit 244 are different. For example, the sub-filter unit 244R may be red and used for transmitting the light of the red primary color and filtering out the light of other colors. The sub-filter unit 244G may be green and used for transmitting the light of the green primary color and filtering out the light of other colors. The sub-filter unit 244B may be blue and used for transmitting the light of the blue primary color and filtering out the light of other colors. The black matrix 242 is also used to separate each of the sub-filter units 244R, 244G and 244B. In the non-display area 114, the corresponding portions of the color filter layer 240 includes the black matrix 242 and does not include sub-filter units 244R, 244G and 244B.

In the color filter layer 240, a non-filter window 142 is provided without filter function, which is used to allow light directly pass through without filtering. The non-filter window 142 is located in the non-display area 114 of the touch display panel 110 and is filled with the transparent material of the sealing layer 250.

The color filter glass 260 is located over the color filter layer 240 and contacts the polarizer 150. In some embodiments, the color filter glass 260 is disposed between the color filter layer 240 and the polarizer 150.

In some embodiments, the embedded touch LCD module 140 further includes an infrared ink layer 270, which is disposed under the thin film transistor layer 210 and corresponds to the position of the optical module 120. That is, the first vertical projection of the non-filter window 142, the second vertical projection of the non-polarized window 152, the third vertical projection of the infrared ink layer 270, and the fourth vertical projection of the optical module 120 overlap, so that light can enter the optical module 120 from the outside or be emitted from the optical module 120.

In some embodiments, the infrared ink layer 270 contains a resin, a pigment and a hardener. The infrared ink layer 270 may have a light transmittance of less than 15% at a wavelength of 550 nm and have a light transmittance of more than 75% at a wavelength of 850 nm.

In some embodiments, when the optical module is an infrared sensing device, the arrangement of the infrared ink layer 270 can effectively increase the transmittance of infrared light and increase the sensitivity and detection distance of the infrared light detection function of the electronic product. In addition, with the low visible light transmittance, the effect of hiding the infrared detection hole can be achieved, so that the appearance of the touch display panel 110 is consistent and the privacy of the infrared sensing device can be maintained.

Referring to FIG. 11B, the polarizer 150 is disposed over the color filter glass 260. In some embodiments, the polarizer 150 is attached to the color filter glass 260 of the embedded touch LCD module 140. The polarizer 150 has a non-polarized window 152 filled with an optical clear material, such as an optical clear adhesive (OCA) or an optical clear resin (OCR).

In some embodiments, when ultra-thin glass is used for the cover plate 160, the optical clear material filled in the non-polarized window 152 preferably has a refractive index ranging from about 1.4 to about 1.7. Since the refractive index of ultra-thin glass is about 1.52, if the refractive index difference between the optical clear material filled in the non-polarized window 152 and the ultra-thin glass of the cover plate 160 is large, when the light passes through the interface between the ultra-thin glass and the optical clear material filled in the non-polarized window 152, the light will have a reflectivity effect, resulting in a decrease in the light transmittance.

Figure 2:
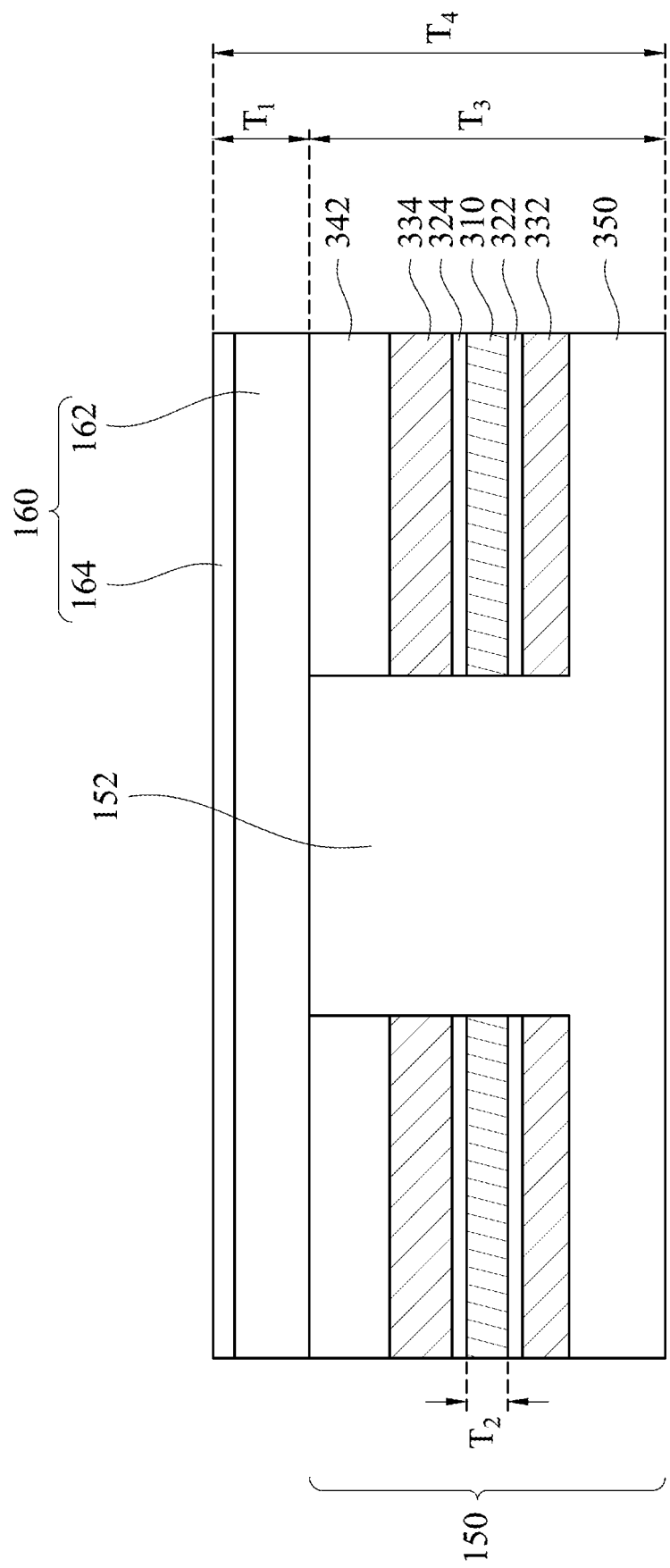
FIG. 2 illustrates a cross-sectional view including a cover plate and a polarizer, in accordance with some embodiments.

Please refer to FIG. 2, which shows the more detailed structure of the polarizer 150 and the cover plate 160.

The polarizer 150 includes a polarizing layer 310, a first adhesive layer 322 under the polarizing layer 310, a second adhesive layer 324 over the polarizing layer 310, a first protective layer 332 under the first adhesive layer 322, a second protective layer 334 over the second adhesive layer 324, and an optical clear adhesive layer 342 over the second protective layer 334. The polarizer 150 has a through hole in which the various materials of the polarizing layer 310, the first adhesive layer 322, the second adhesive layer 324, the first protective layer 332, and the second protective layer 334 are removed, and the through hole is filled with an optical clear material 350.

In some embodiments, the material of the polarizing layer 310 includes polyvinyl alcohol (PVA). Since polyvinyl alcohol is easy to hydrolyze, a first protective layer 332 and a second protective layer 334 are provided on both sides of the polarizing layer 310.

The first protective layer 332 is attached to the bottom of the polarizing layer 310 via the first adhesive layer 322. The second protective layer 334 is attached over the polarizing layer 310 via the second adhesive layer 324. In some embodiments, the materials of the first adhesive layer 322 and the second adhesive layer 324 may be solid optically clear adhesive (OCA).

The material of the first protective layer 332 may be triacetyl cellulose (TAC), and the phase of the first protective layer 332 is 0 degrees. The material of the second protective layer 334 may also be triacetyl cellulose. The material of triacetyl cellulose has high light transmittance, so triacetyl cellulose is used as a protective layer to protect the polarizing layer 310 without affecting the display effect.

The optical clear adhesive layer 342 is disposed on the second protective layer 334 for attaching the polarizer 150 to an upper structural layer, such as the cover plate 160. In some embodiments, when the polarizer is not bonded or attached to other layer, the polarizer also includes a releasing film layer (not shown) bonded on the optical clear adhesive layer 342, and this releasing film is removed during bonding.

In some embodiments, the optical clear material 350 is solid optical clear adhesive (OCA) or liquid optical clear resin (OCR).

Figure 3:
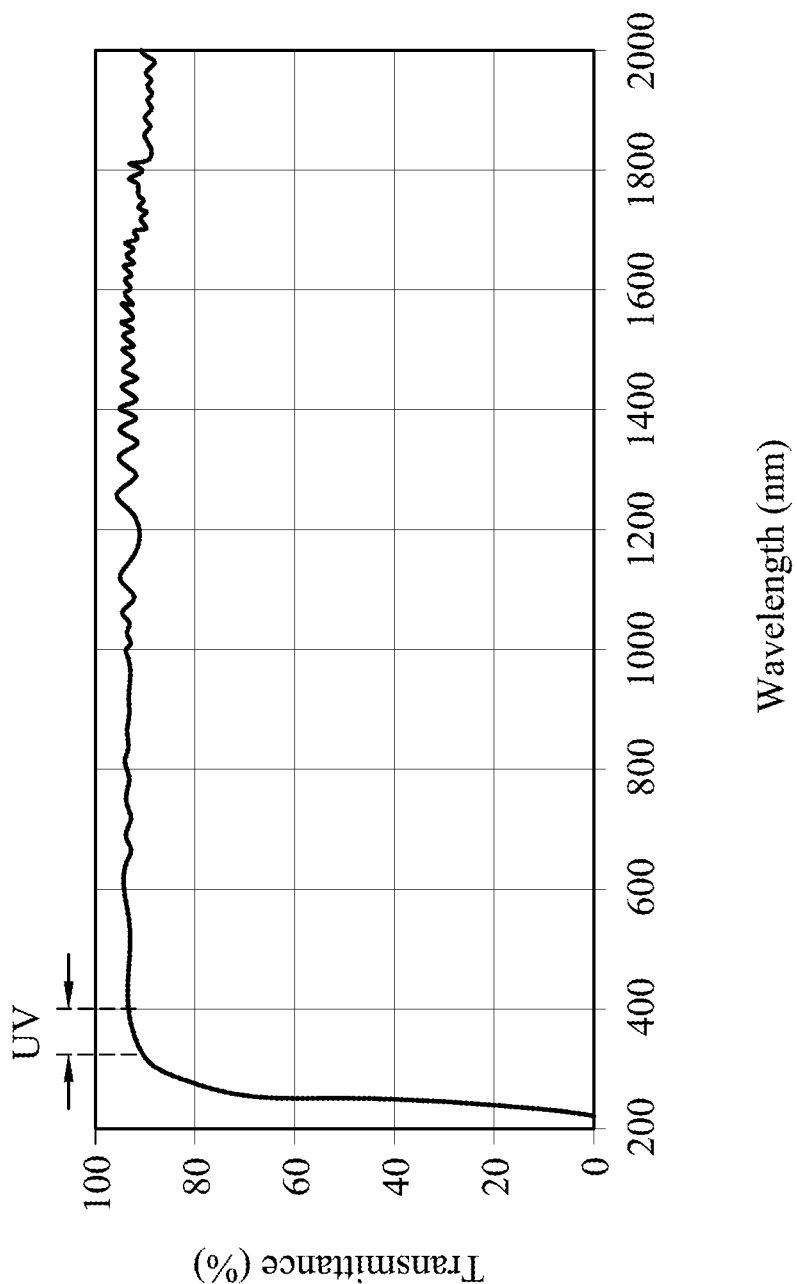
FIG. 3 shows the transmittance of an optical clear adhesive at different wavelengths.

FIG. 3 shows the light transmittance of the optical clear material 350 at different wavelengths according to an embodiment of the present disclosure. It shows that the transmittance is greater than 92% in the wavelength range of 400 to 1600. FIG. 3 also shows that the optical clear material has no significant ultraviolet transmission and absorption phenomenon in the ultraviolet wavelength region less than about 400 nm.

Referring to FIG. 1B again, the cover plate 160 is disposed over the polarizer 150. In some embodiments, the cover plate 160 is attached on the polarizer 150.

In some embodiments, the cover plate 160 includes a transparent material such as ultra-thin glass (UTG), polymethylmethacrylate (PMMA), polyethylene terephthalate (PET), polycarbonate (PC), or the like.

In some embodiments, the material of the cover plate 160 does not contain triacetyl cellulose.

In some embodiments, the cover plate 160 has a thickness ranging from about 25 µm to about 200 µm, such as 25 µm, 30 µm, 50 µm, 70 µm, 100 µm, 145 µm, 175 µm, or 200 µm. In some embodiments, the cover plate 160 had a thickness ranging from about 25 µm to about 50 µm. In some embodiments, the thickness variation of the cover plate 160 is less than 5 µm. In some embodiments, the thickness tolerance of the cover plate 160 is ±10 µm. In some embodiments, the surface roughness of the cover plate 160 is less than 1 nanometer (nm).

In some embodiments, the material of the cover plate is ultra-thin glass having a thickness ranging from about 25 µm to about 50 µm.

In some embodiments, the material of the cover plate 160 is ultra-thin glass, and the hardness of the cover plate 160 is equal to or greater than pencil hardness 7H, for example, the hardness is 7H, 8H or 9H. In some embodiments, the cover plate is tempered ultra-thin glass, i.e., ultra-thin glass that has been strengthened, such as glass that has been chemically strengthened. In some embodiments, a high-purity potassium nitrate solution is used with a catalyst to act on the material of ultra-thin glass, so that ions in the glass component exchange with potassium ions in the potassium nitrate solution, thereby forming a strengthened layer. Therefore, using a cover plate containing ultra-thin glass on the outer surface of the touch display panel is less likely to cause broken screen due to breakage.

As shown in FIG. 2, in some embodiments, the cover plate 160 includes a substrate layer 162 and an optical layer 164 disposed over the substrate layer 162. The substrate layer 162 of the cover plate 160 may be a transparent material such as ultra-thin glass, polymethylmethacrylate, polyethylene terephthalate, polycarbonate, or the like. A surface treatment may be performed on the upper surface of the substrate layer 162 to form a surface coating (i.e., the optical layer 164), such as an anti-reflection layer, an anti-glare layer, an anti-fouling layer, the like, or a combination thereof.

In some embodiments, the optical layer 164 is or includes an anti-reflection layer. The anti-reflection layer is formed by plating or coating a film layer for reducing reflectivity on the substrate layer 162 of the cover plate 160.

In some embodiments, the optical layer 164 is or includes an anti-glare layer. The anti-glare layer, also known as Anti-Glare Coating (AG coating), uses the uniform atomization of the surface to achieve the scattering effect of reflected light, reduce the reflected light of the processed surface, and reduce the interference of light on the eyes.

In some embodiments, the optical layer 164 is or includes an anti-fouling layer. The anti-fouling layer is also called anti-smudge coating or anti-fingerprint coating. Under visible light and infrared light, the coating of the anti-fouling layer is transparent, and the coating of the anti-fouling layer has the characteristics of low friction coefficient and water contact angle greater than 110°, which can make the surface of the product coated have functions such as the anti-fouling layer have high waterproof, fingerprint-proof, anti-fouling, anti-fog, scratch-proof, anti-static, easy-to-wipe, or the like.

Referring to FIG. 2, the cover plate 160 has a first thickness T1, which may range from about 25 µm to about 200 µm. In some embodiments, the first thickness T1 may be in a range from about 25 µm to about 50 µm, such as about 30 µm. Therefore, using such thin cover plate as the cover plate of the touch display panel will not cause a significant increase in thickness, and the thickness size of the touch display panel can be reduced.

The polarizing layer 310 of the polarizer 150 may have a second thickness T2, which may be in the range of about 10 µm to about 20 µm, for example, about 12 µm.

The entire layer of the polarizer 150 may have a third thickness T3, which may be in the range of about 90 μm to about 150 μm, for example, about 110 μm.

The cover plate 160 and the polarizer 150 have a total thickness T4, which may be in the range of about 110 μm to about 300 μm, preferably in the range of about 115 μm to about 150 μm, more preferably in the range of 120 μm to about 140 μm, for example, about 137 μm.

Using a thin cover plate will not significantly increase the total thickness of the touch display panel. In some embodiments, the use of ultra-thin glass in the cover plate can enhances the surface strength and hardness of the touch display panel, as well as the user's touch feel. Further, since the cover plate covers the polarizer having the non-polarized window, the user contact surface of the touch display panel is completely flat, and even a stylus pen can be used to operate over the non-polarized window, so that the user experience can be improved.

The following FIGS. 4A and 4B through FIGS. 10A and 10B illustrate the processes of manufacturing a touch display panel according to some embodiments.

Figure 4A:
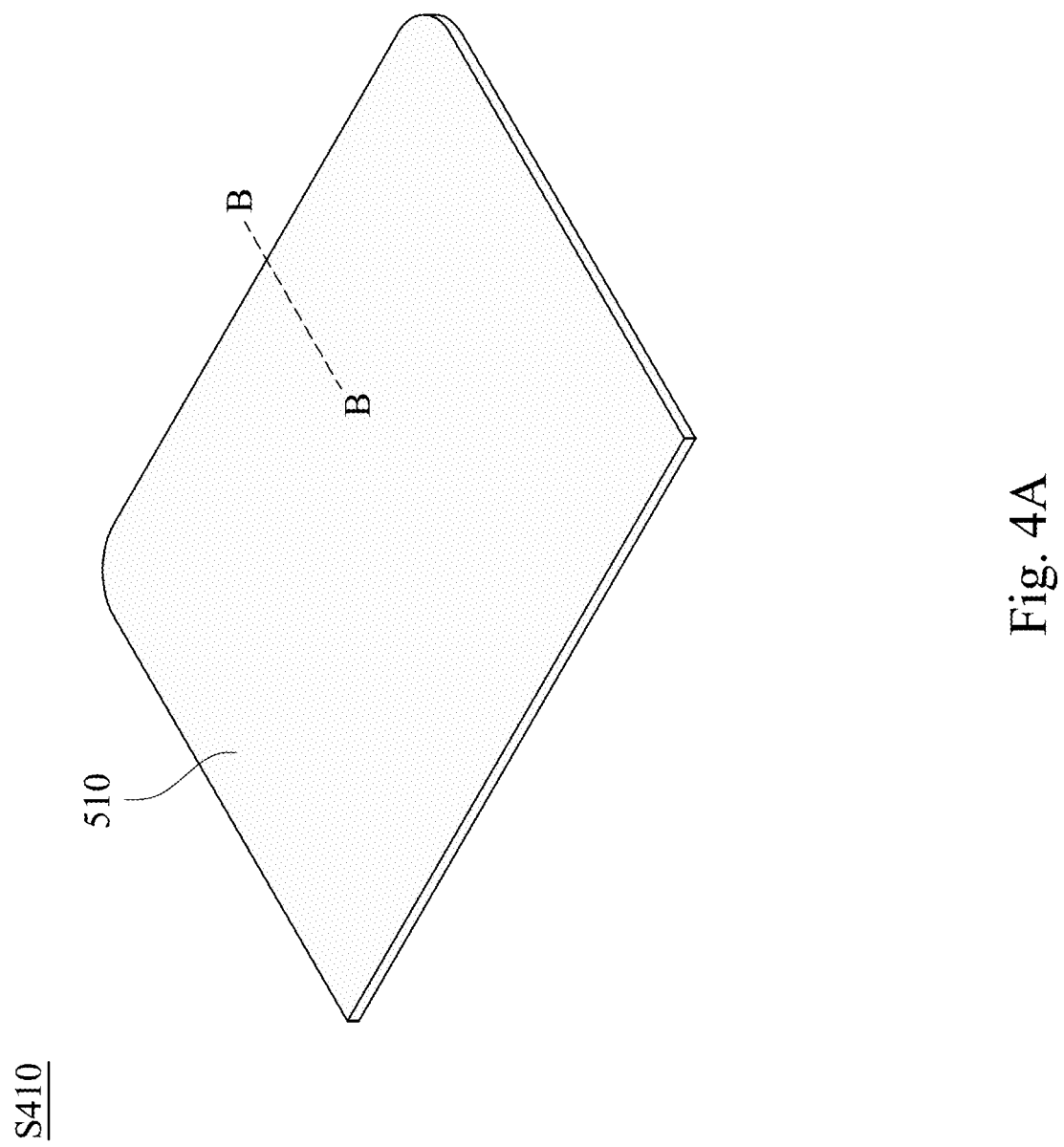
FIG. 4A illustrates a perspective view of an intermediate structure at an intermediate stage during the method for manufacturing the touch display panel, in accordance with some embodiments.
Figure 4B:
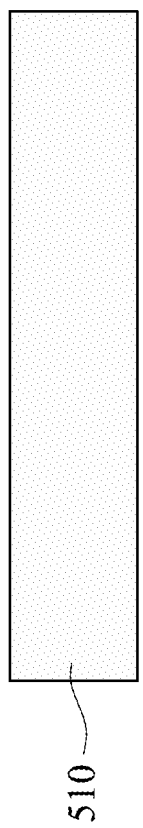
FIG. 4B is a cross-sectional view of the intermediate structure of FIG. 4A along cutting line B-B.

Referring to FIGS. 4A and 4B, in step S410, an initial polarizer is provided. For simplicity, the cross-sectional view of the initial polarizer 510 is shown as a single layer in FIG. 4B. The initial polarizer 510 may include a polarizing layer 310, a first adhesive layer 322 on the lower side of the polarizing layer 310, a second adhesive layer 324 on the upper side of the polarizing layer 310, a first protective layer 332 on the lower side of the first adhesive layer 322, and a second protective layer 334 on the upper side of the second adhesive layer 324, as shown in FIG. 2.

Figure 5A:
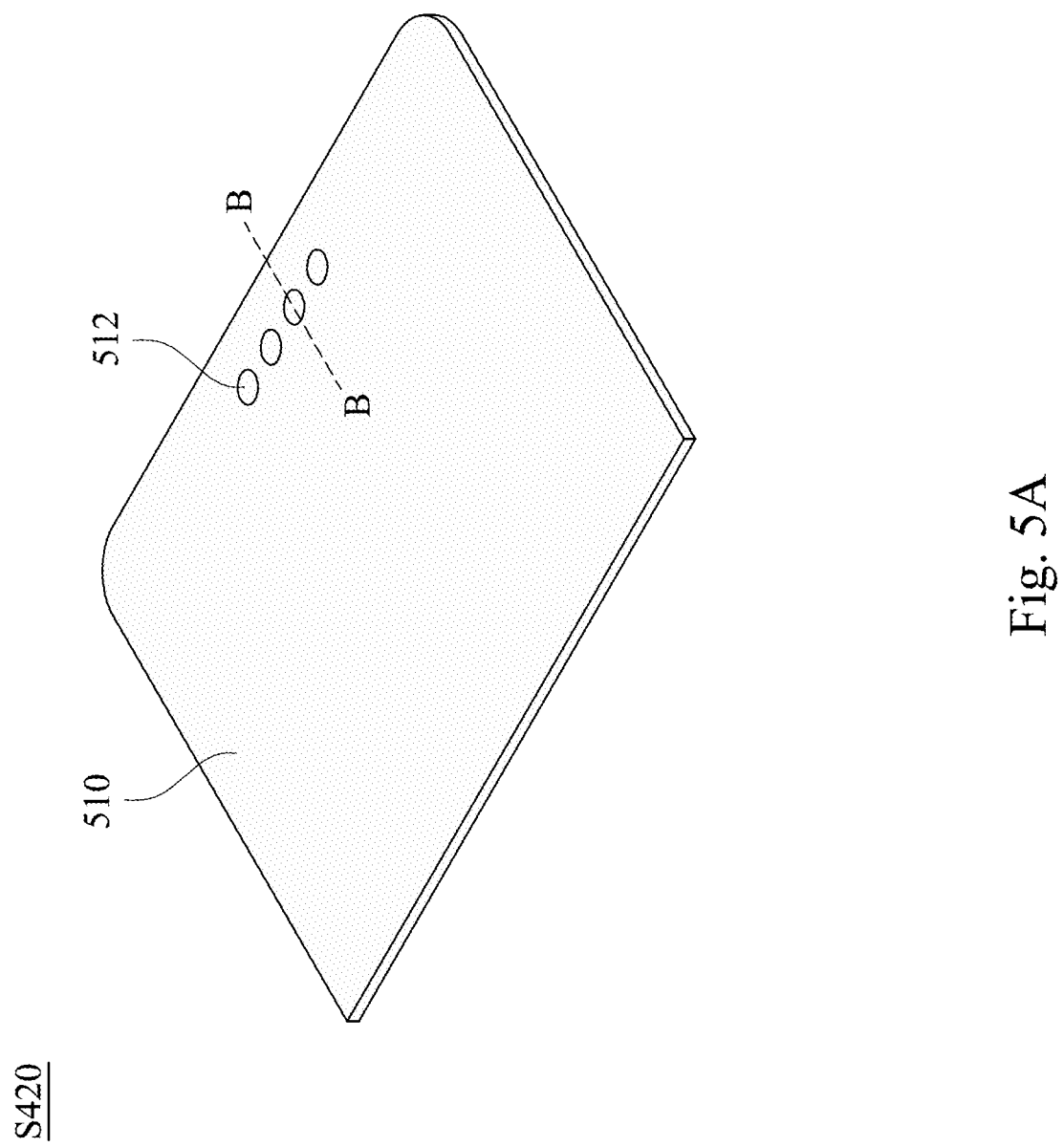
FIG. 5A illustrates a perspective view of an intermediate structure at an intermediate stage during the method for manufacturing the touch display panel, in accordance with some embodiments.
Figure 5B:
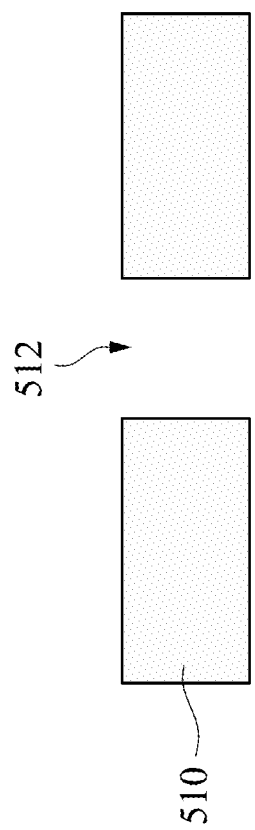
FIG. 5B is a cross-sectional view of the intermediate structure of FIG. 5A along cutting line B-B.

Referring to FIGS. 5A and 5B, in step S420, a through hole is formed in the initial polarizer. A plurality of through holes 512 in the initial polarizer 510 may be formed by punching or laser cutting, to remove the structure of each layer of the initial polarizer 510 in the region of the through holes 512.

Figure 6A:
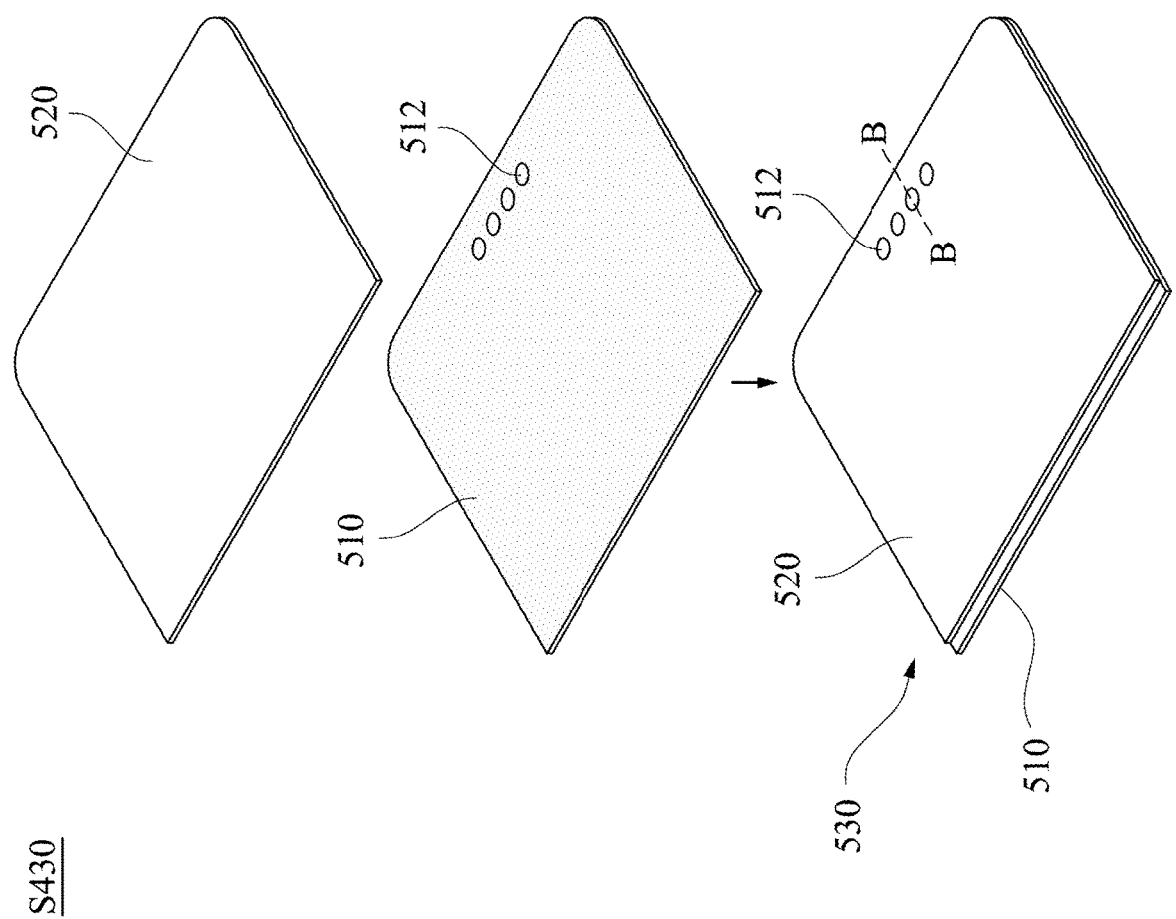
FIG. 6A illustrates a perspective view of an intermediate structure at an intermediate stage during the method for manufacturing the touch display panel, in accordance with some embodiments.
Figure 6B:
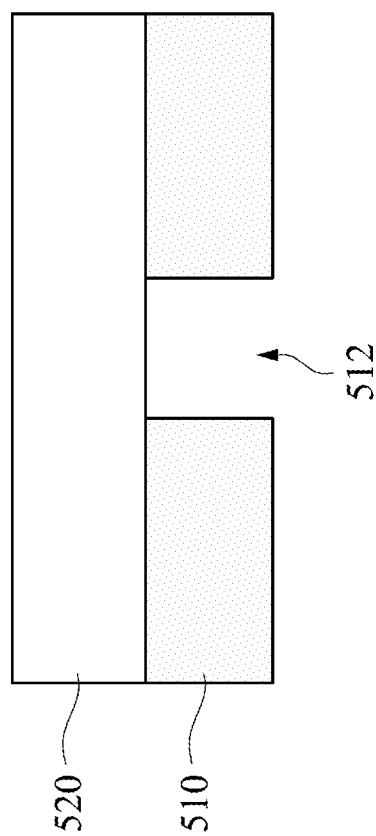
FIG. 6B is a cross-sectional view of the intermediate structure of FIG. 6A along cutting line B-B.

Referring to FIGS. 6A and 6B, in step S430, an initial polarizer having the through holes is attached to a cover plate to obtain a first stack structure. In some embodiments, the size of the initial polarizer 510 is similar to and slightly larger than that of the cover plate 520. As shown in FIG. 6A, in one side of the first stack structure 530, the edge of the side of the initial polarizer 510 protrudes from the edge of the corresponding side of the cover plate 520. In some embodiments, edges of multiple sides of the initial polarizer 510 are larger than edges of the corresponding multiple sides of the cover plate 520.

Figure 7A:
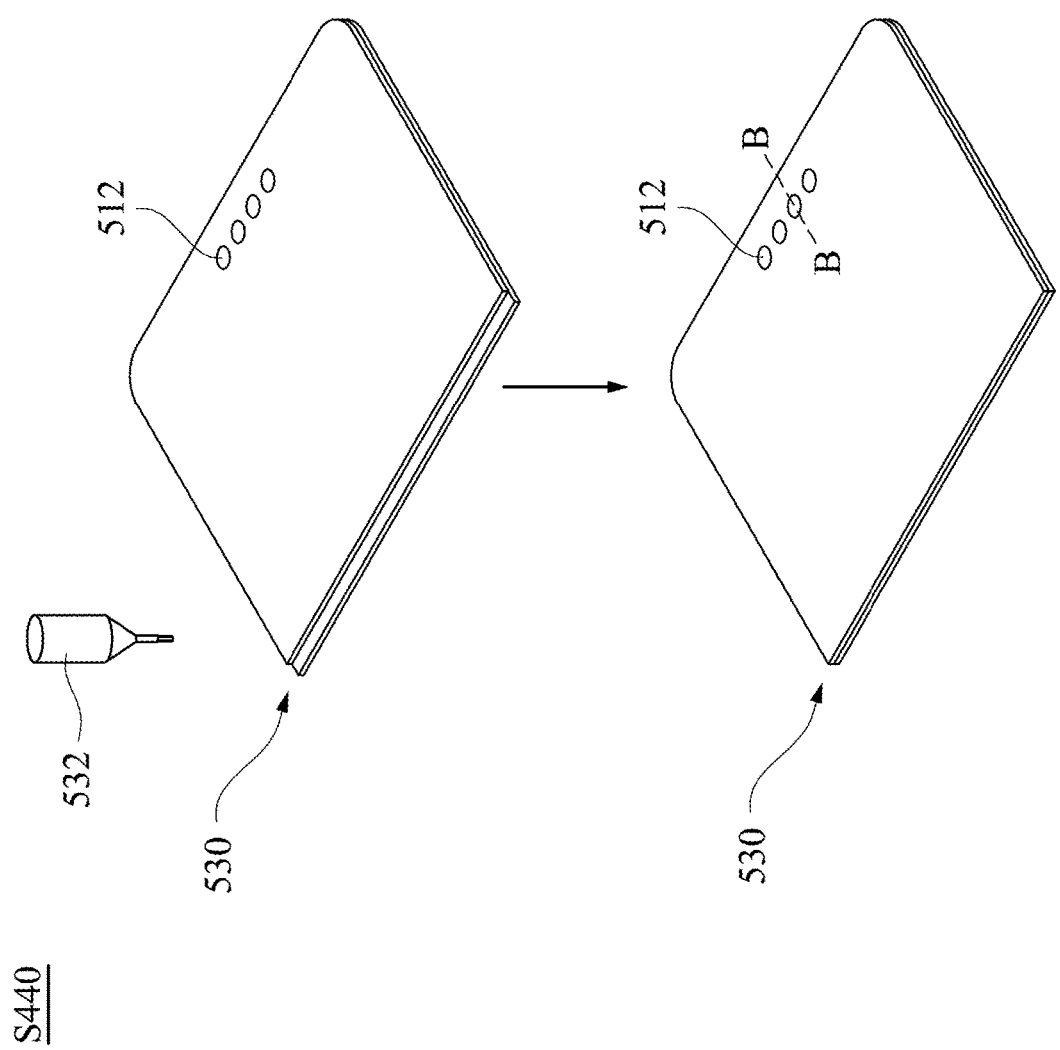
FIG. 7A illustrates a perspective view of an intermediate structure at an intermediate stage during the method for manufacturing the touch display panel, in accordance with some embodiments.
Figure 7B:
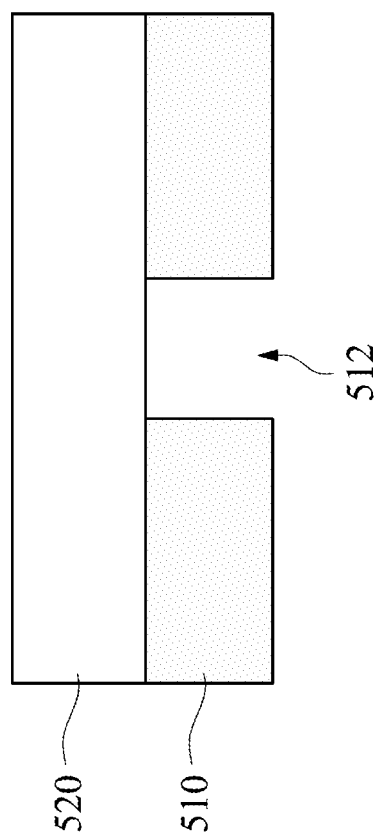
FIG. 7B is a cross-sectional view of the intermediate structure of FIG. 7A along cutting line B-B.

Referring to FIGS. 7A and 7B, in step S440, the edges of the first stacked structure are trimmed. In some embodiments, the edges of the first stacked structure 530 are trimmed by a laser device 532. The advantages of using laser cutting include small edge collapse, high cutting accuracy, no crack and special-shaped cutting. In some embodiments, the laser may be an ultraviolet laser or a carbon dioxide laser.

Figure 8A:
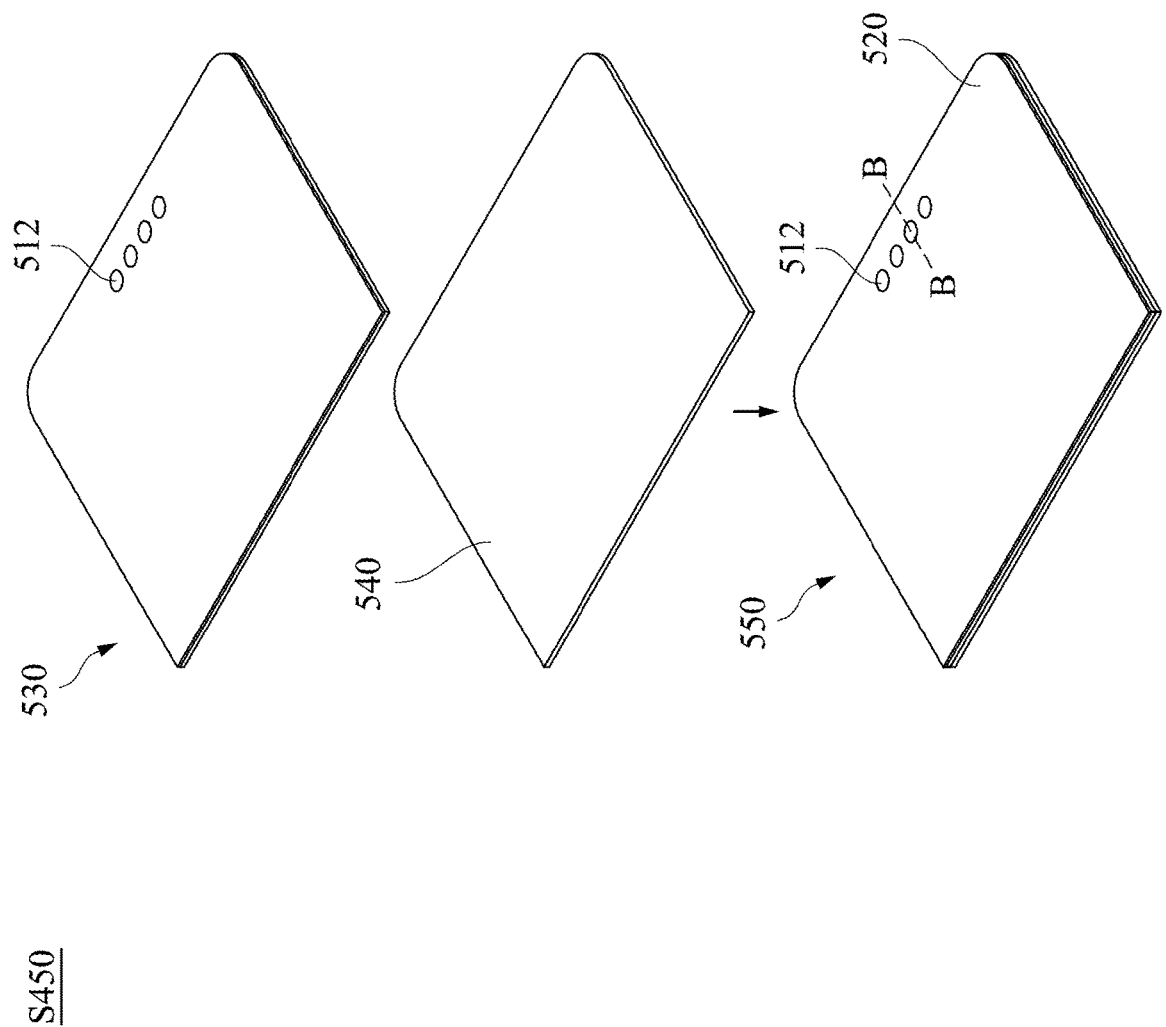
FIG. 8A illustrates a perspective view of an intermediate structure at an intermediate stage during the method for manufacturing the touch display panel, in accordance with some embodiments.
Figure 8B:
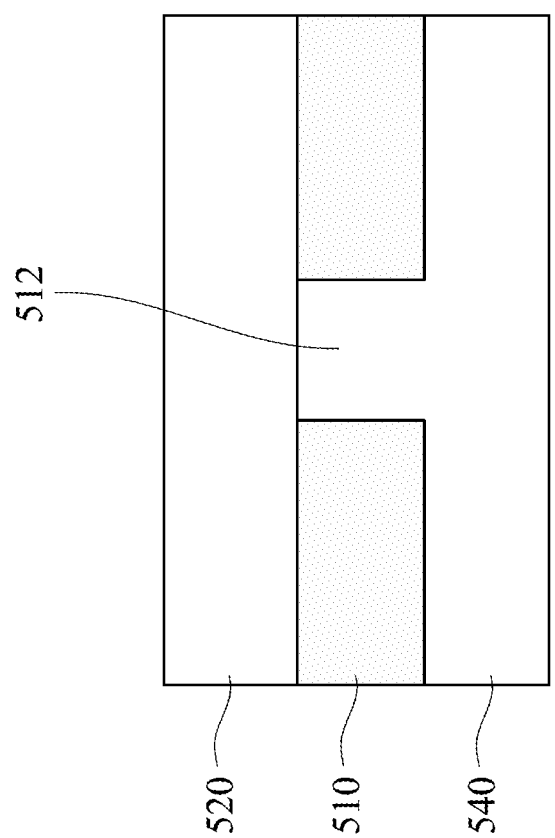
FIG. 8B is a cross-sectional view of the intermediate structure of FIG. 8A along cutting line B-B.

Referring to FIGS. 8A and 8B, in step S450, an optical clear material is applied to the initial polarizer of the first stacked structure to form a second stack structure. As shown in FIG. 8B, in the second stack structure 550, an optical clear material 540 fills the through hole 512 to form a non-polarized window. In addition, the optical clear material 540 is located under the initial polarizer 510 and is used for attaching another structure, for example, the embedded touch LCD module. In some embodiments, the optical clear material 540 is a solid optical clear adhesive or a liquid optical clear resin. The solid optical clear adhesive may be attached on the surface of the initial polarizer 510 away from the cover plate 520. Liquid optical clear resin can be coated on the surface of the initial polarizer 510 away from the cover plate and then heated to about 80° C. or pre-cured by ultraviolet irradiation; next, the optical clear resin is heated to about 80° C. or irradiated with ultraviolet light for full curing.

Figure 9A:
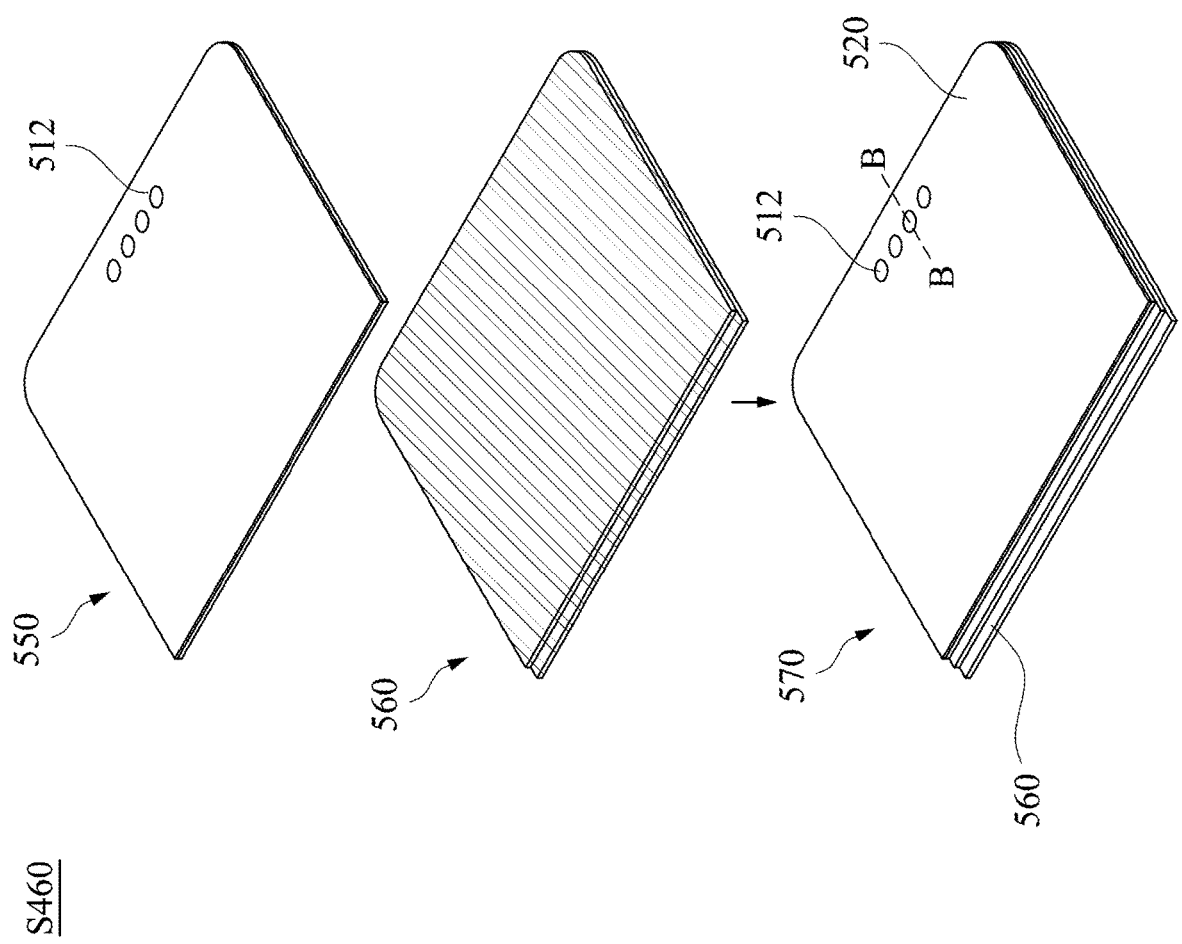
FIG. 9A illustrates a perspective view of an intermediate structure at an intermediate stage during the method for manufacturing the touch display panel, in accordance with some embodiments.
Figure 9B:
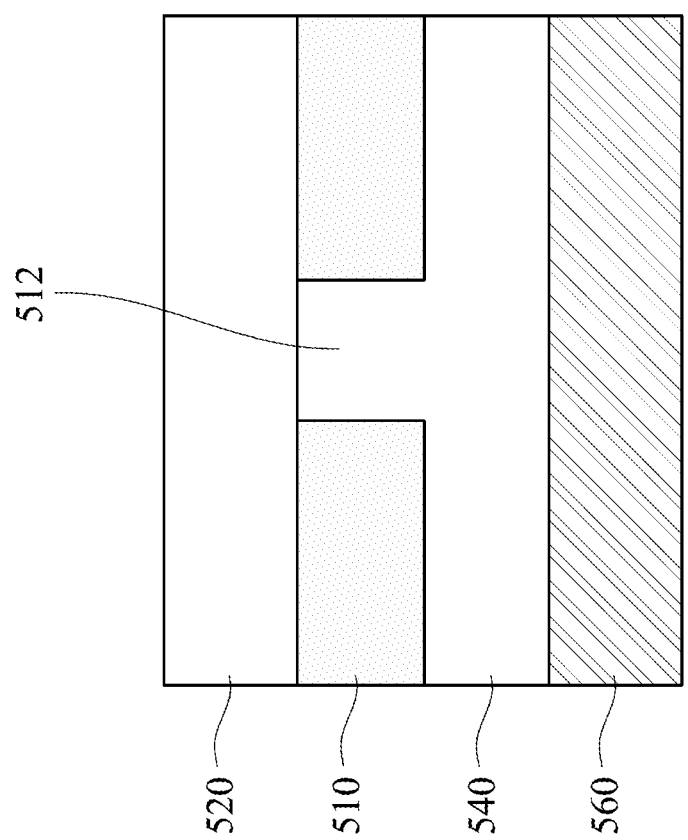
FIG. 9B is a cross-sectional view of the intermediate structure of FIG. 9A along cutting line B-B.

Referring to FIGS. 9A and 9B, in step S460, the second stack structure is attached to an embedded touch LCD module to form a third stack structure. FIG. 9B illustrates only a portion of the embedded touch LCD module; please refer to FIG. 1B and the following FIG. 12 together. The embedded touch LCD module 560 has a non-filter window, such as the non-filter window 142 in FIG. 1B or the non-filter window 562 in FIG. 12, and the position of the through hole 512 corresponds to the non-filter window.

Figure 10A:
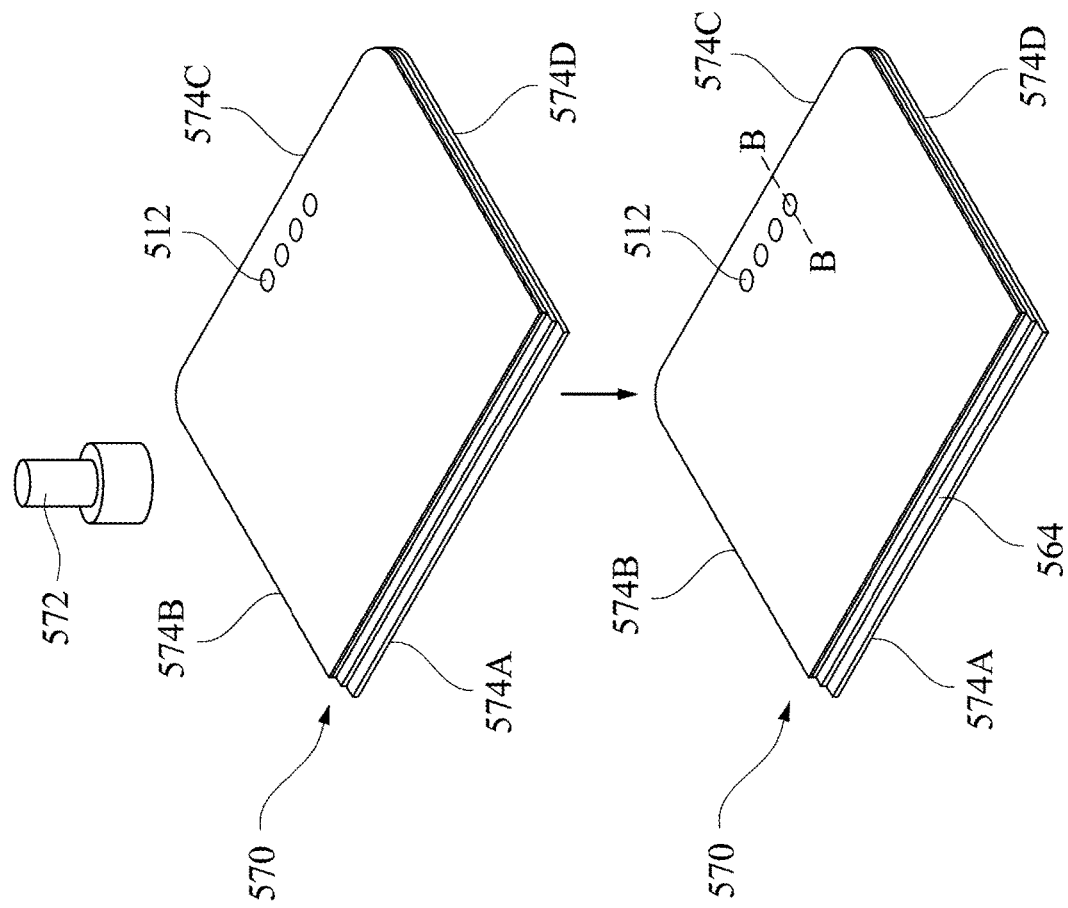
FIG. 10A illustrates a perspective view of an intermediate structure at an intermediate stage during the method for manufacturing the touch display panel, in accordance with some embodiments.
Figure 10B:
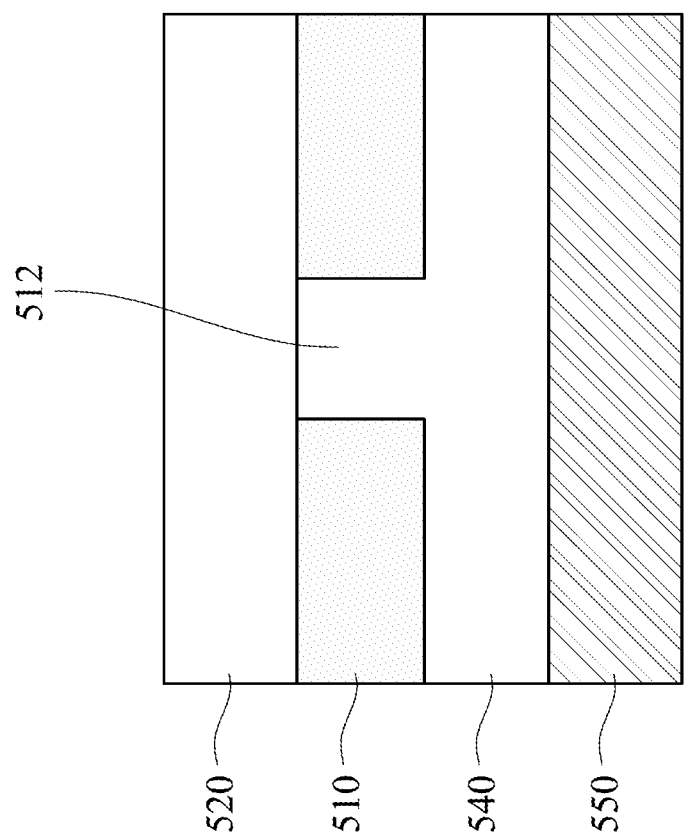
FIG. 10B is a cross-sectional view of the intermediate structure of FIG. 10A along cutting line B-B.

Referring to FIGS. 10A and 10B, in step S470, the edges of the non-terminal region of the third stacked structure are grinded. The third stack structure 570 has a first side 574A, a second side 574B, a third side 574C, and a fourth side 574D. The embedded touch LCD module 560 has a terminal region 564 near the first side 574A of the third stack structure 570. The edges of the second side 574B, the third side 574C, and the fourth side 574D of the third stack structure are grinded by the grinding device 572, so that the corresponding edges of the cover plate 520, the polarizer, and the embedded touch LCD module 560 are flush and smooth at these sides. To avoid contamination of the terminal region 564, the first side 574A is not grinded.

Figure 11:
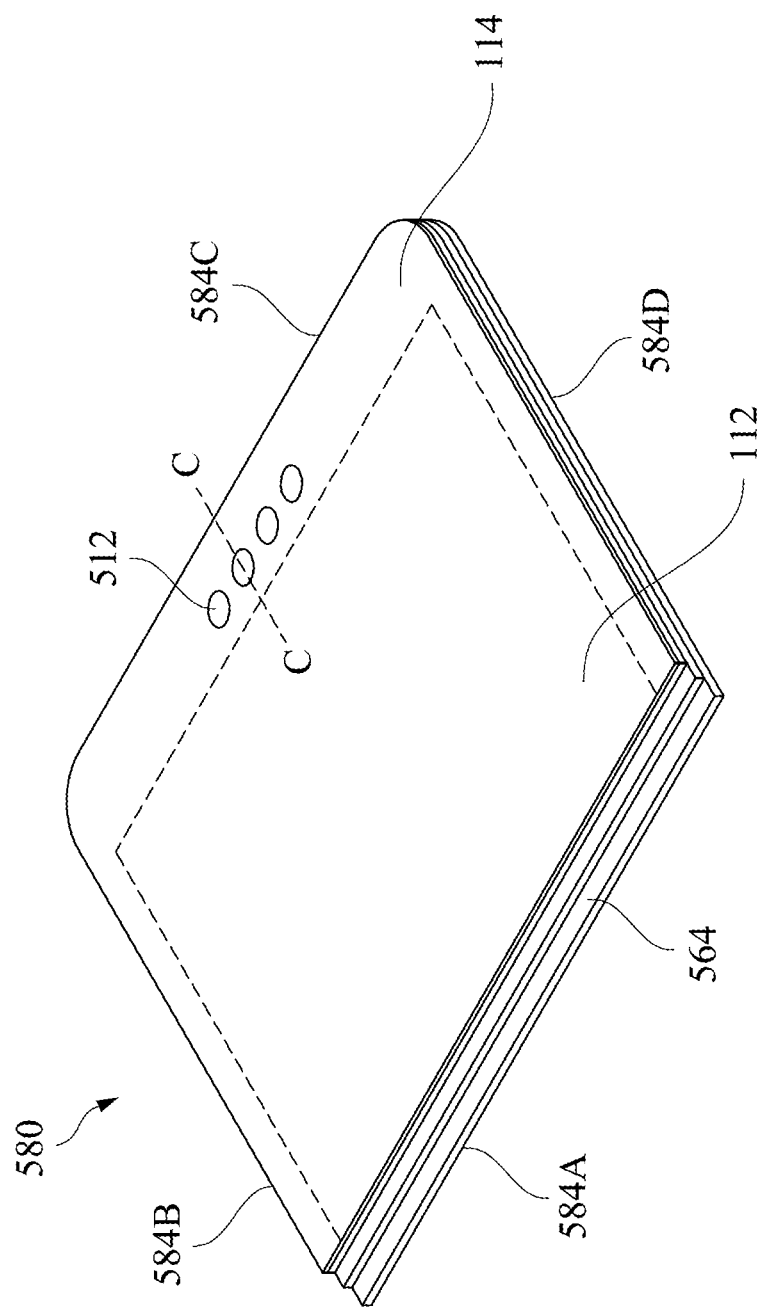
FIG. 11 illustrates a touch display panel according to some embodiments.

FIG. 11 illustrates a top view of a touch display panel formed by a manufacturing method according to embodiments of the present disclosure. The touch display panel 580 includes a display area 112 and a non-display area 114 outside the display area 112. The display area 112 may be referred to as an active area of a LCD Module (LCM) (i.e., LCM AA area), as shown in FIG. 1B, which corresponds to the region of the color filter layer 240 having sub-filter units 244R, 244G, and 244B. The non-display area 114 may be referred to as a black matrix area (BM area), that is, a black edge around the display area 112, as shown in FIG. 1B, which corresponds to the position of the black matrix 242 at the periphery of the display device 100.

As shown in FIG. 11, the touch display panel 580 has a first side 584A, a second side 584B, a third side 584C, and a fourth side 584D. The embedded touch LCD module includes a terminal region 564 located near the first side 584A of the touch display panel 580. In the second side 584B, the third side 584C, and the fourth side 584D, a plurality of corresponding edges of the embedded touch LCD module, the polarizer, and the cover plate are flush.

In some embodiments, as shown in FIG. 11, in the first side 584A, the edge of the embedded touch LCD module exceeds the corresponding edge of the cover plate and the corresponding edge of the polarizer. In some embodiments, the touch display panel 580 is then assembled, for example, the touch display panel is joined with a circuit board, and a backlight board is provided. In some embodiments, the first side 584A can be covered with a metal sheet (e.g., an iron sheet) during assembling the whole machine.

In other embodiments, in the first side 584A, a plurality of corresponding edges of the embedded touch LCD module, the polarizer, and the cover plate are flush (not shown). That is, the cover plate and the polarizer can also be arranged to cover the terminal region 564 of the embedded touch LCD module.

Figure 12:
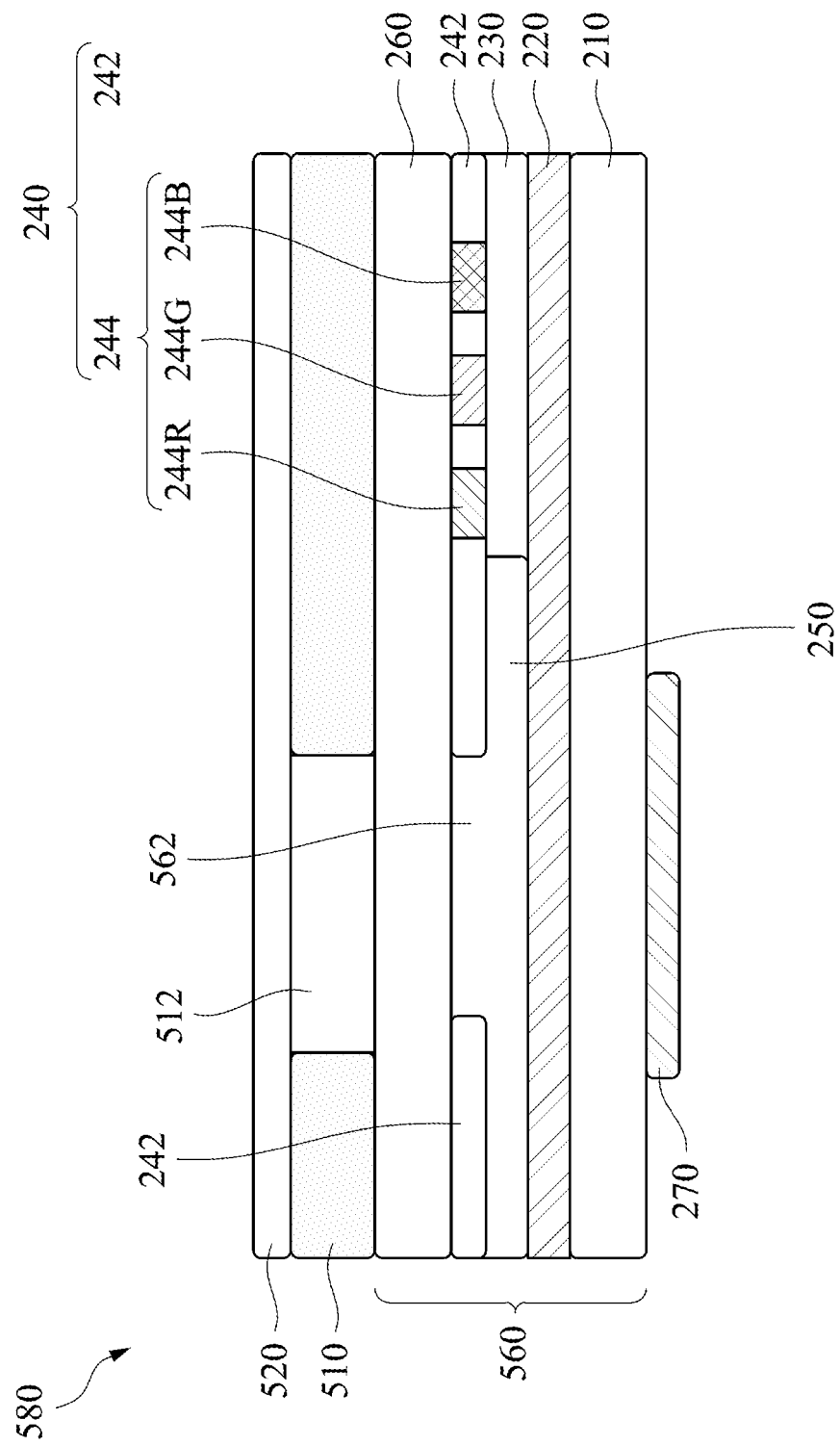
FIG. 12 is a cross-sectional view of the touch display panel of FIG. 11 along cutting line C-C.

FIG. 12 is a cross-sectional view of the touch display panel of FIG. 11 along cutting line C-C. It can be seen that the touch display panel 580 includes an embedded touch LCD module 560, a polarizer 510, and a cover plate 520 which are sequentially stacked. The position of the through hole 512 (i.e., the non-polarized window) of the polarizer 510 corresponds to the non-filter window 562 of the embedded touch LCD module 560.

For each layer of the embedded touch LCD module 560 in FIG. 12, please refer to the relevant description of the elements with the same reference number in FIG. 1B, and the description will not be repeated here.

In some embodiments, after the touch display panel is formed, the whole machine is assembled, and the touch display panel is assembled with the optical module, the backlight module and other components to form a display device. The display device may be, for example, a mobile phone, a tablet computer, a notebook computer, a wearable device (for example, a smart watch), or other display devices having touch function.

According to the touch display panel and the display device including the touch display panel provided by various embodiments of the present disclosure, the outermost user's contact surface of the display panel is a cover plate, and the outer surface of the touch display panel is a full-plane surface, which can be operated by a stylus pen, so that the operation is more convenient and the user's touch feeling is improved. That is to say, there is no notch or depression in the cover plate corresponding to the underlying light sensor module and the non-polarized window, but the full-plane cover plate is located outside the touch display panel. In some embodiments, the cover plate uses ultra-thin glass, which can achieve a thinner and lighter display panel and better enhance the user's touch feeling. In addition, the polarizer over the liquid crystal layer has a non-polarized window, so the polarizer does not affect the function of the underlying optical module. Furthermore, in the formed display panel, the contours of the cover plate, the polarizer and the embedded touch LCD module on the left side (i.e., the second side), the upper side (i.e., the third side) and the right side (i.e., the fourth side) are consistent and beautiful.

Although the present disclosure has been disclosed in many embodiments and examples, it is not intended to limit the present disclosure. Anyone skilled in the art can make various changes and modifications without departing from the spirit and scope of the present disclosure. Therefore, the scope of protection of the present disclosure shall be subject to the scope of the appended claims.

What is claimed is:

1. A touch display panel comprising:
    an embedded touch liquid crystal display (LCD) module, comprising: a thin film transistor layer, a touch layer on the thin film transistor layer, a color filter layer on the touch layer, and a color filter glass on the color filter layer, wherein a non-filter window passes through the color filter layer;
    a polarizer, disposed over the embedded touch LCD module, wherein the polarizer has a non-polarized window, a first vertical projection of the non-polarized window overlaps with a second vertical projection of the non-filter window, the polarizer comprises a polarizing layer, a first protective layer disposed under the polarizing layer, a second protective layer disposed over the polarizing layer, an optical clear material disposed under the first protective layer, and an optical clear adhesive layer disposed over the second protective layer, the polarizing layer, the first protective layer, the second protective layer, and the optical clear adhesive layer are removed in the non-polarized window, and the non-polarized window is filled with the optical clear material; and
    a cover plate, overlaying the polarizer, wherein the cover plate comprises a tempered ultra-thin glass, the tempered ultra-thin glass has a thickness less than 50 μm, the cover plate is free of triacetyl cellulose, a hardness of the tempered ultra-thin glass is greater than 7H of pencil hardness, a surface roughness of the cover plate is less than 1 nm, the polarizer and the cover plate have a total thickness less than 300 μm, and the optical clear material in the non-polarized window contacts the cover plate;
    wherein the optical clear adhesive layer is connected with the cover plate in an area outside the non-polarized window of the polarizer, and the optical clear material is connected with the embedded touch LCD module;
    wherein the polarizer is located between the color filter glass and the tempered ultra-thin glass and is attached to the color filter glass, and the optical clear material in the non-polarized window and the optical clear adhesive layer of the polarizer are flush with each other and both are directly attached to the cover plate.

2. The touch display panel of claim 1, wherein the cover plate has a thickness less than about 200 μm.

3. The touch display panel of claim 1, wherein the cover plate comprises a substrate layer and an optical layer, and the optical layer is an anti-reflection layer, an anti-glare layer, an anti-fouling layer, or a combination thereof.

4. The touch display panel of claim 1, wherein the optical clear material has a refractive index ranging from about 1.4 to about 1.7.

5. The touch display panel of claim 1, wherein the optical clear material includes an optical clear adhesive or an optical clear resin.

6. The touch display panel of claim 1, further comprising an infrared ink layer disposed under the embedded touch LCD module, wherein a third vertical projection of the infrared ink layer overlaps with the first vertical projection of the non-filter window and the second vertical projection of the non-polarized window.

7. The touch display panel of claim 1, wherein the touch display panel has a first side, a second side, a third side and a fourth side, and the embedded touch LCD module further comprises a terminal region located near the first side of the touch display panel, and in the second side, the third side and the fourth side, a plurality of respective edges of the embedded touch LCD module, the polarizer, and the cover plate are flush.

8. The touch display panel of claim 7, wherein in the first side, an edge of the embedded touch LCD module exceeds a corresponding edge of the cover plate and a corresponding edge of the polarizer.

9. The touch display panel of claim 7, wherein in the first side, an edge of the embedded touch LCD module is flush with a corresponding edge of the cover plate and a corresponding edge of the polarizer.

10. A display device comprising:
    the touch display panel of claim 1; and
    an optical module, disposed under the embedded touch LCD module, and a fourth vertical projection of the optical module overlaps with the first vertical projection of the non-filter window and the second vertical projection of the non-polarized window.

11. A method for manufacturing a touch display panel, the method comprising:

receiving an initial polarizer, wherein the initial polarizer comprises a polarizing layer, a first protective layer disposed under the polarizing layer, a second protective layer disposed over the polarizing layer, and an optical clear adhesive layer disposed over the second protective layer;

forming a through hole in the initial polarizer, wherein the through hole passes through the polarizing layer, the first protective layer, the second protective layer, and the optical clear adhesive layer;

attaching the initial polarizer to a cover plate to form a first stack structure, wherein the optical clear adhesive layer is connected with the cover plate, wherein the cover plate comprises a tempered ultra-thin glass, the tempered ultra-thin glass has a thickness less than 50 μm, the cover plate is free of triacetyl cellulose, a hardness of the tempered ultra-thin glass is greater than 7H of pencil hardness, a surface roughness of the cover plate is less than 1 nm, and the initial polarizer and the cover plate have a total thickness less than 300 μm;

trimming an edge of the first stack structure;

applying an optical clear material on the initial polarizer of the first stack structure to form a second stack structure, wherein the optical clear material fills the through hole to form a non-polarized window; and attaching the second stack structure with an embedded touch LCD module to form a third stack structure, wherein the optical clear material is connected with the embedded touch LCD module, the embedded touch LCD module comprises: a thin film transistor layer, a touch layer on the thin film transistor layer, a color filter layer on the touch layer, and a color filter glass on the color filter layer, a non-filter window passes through the color filter layer, a position of the non-polarized window corresponds to the non-filter window, and the initial polarizer is located between the color filter glass and the tempered ultra-thin glass and is attached to the color filter glass, and the optical clear material in the non-polarized window and the optical clear adhesive layer of the initial polarizer are flush with each other and both are directly attached to the cover plate.

12. The method for manufacturing the touch display panel of claim 11, wherein the third stack structure has a first side, a second side, a third side and a fourth side, and the embedded touch LCD module has a terminal region near the first side of the third stack structure, and the method further comprises grinding edges of the second side, the third side and the fourth side of the third stack structure.

13. The method for manufacturing the touch display panel of claim 11, wherein the through hole is formed in the initial polarizer by punching or laser cutting.

14. The touch display panel of claim 1, wherein the tempered ultra-thin glass has a thickness ranging from about 25 μm to about 30 μm.

15. The touch display panel of claim 1, wherein the polarizer and the cover plate have the total thickness less than 150 μm.

16. The method for manufacturing the touch display panel of claim 11, wherein the tempered ultra-thin glass has a thickness ranging from about 25 μm to about 30 μm.

17. The method for manufacturing the touch display panel of claim 11, wherein the initial polarizer and the cover plate have the total thickness less than 150 μm.

18. The touch display panel of claim 1, wherein the non-polarized window is filled with a sealing layer, the color filter layer comprises a liquid crystal layer, the sealing layer and the liquid crystal layer are disposed in a same layer, and the touch layer contacts the sealing layer and the liquid crystal layer.

19. The method for manufacturing the touch display panel of claim 11, wherein the non-polarized window is filled with a sealing layer, the color filter layer comprises a liquid crystal layer, the sealing layer and the liquid crystal layer are disposed in a same layer, and the touch layer contacts the sealing layer and the liquid crystal layer.

* * * * *